US009135190B1

United States Patent
Bruce et al.

(10) Patent No.: US 9,135,190 B1
(45) Date of Patent: Sep. 15, 2015

(54) MULTI-PROFILE MEMORY CONTROLLER FOR COMPUTING DEVICES

(75) Inventors: Ricardo H. Bruce, Union City, CA (US); Marlon B. Verdan, Paranaque (PH); Margaret Anne N. Somera, Caloocan (PH); Rowenah Michelle D. Jago-on, Pasig (PH); Maria Eliza B. De Belen, Quezon (PH); Ron Kelvin B. Palacol, Laguna (PH)

(73) Assignee: BiTMICRO Networks, Inc., Fremont, CA (US)

( * ) Notice: Subject to any disclaimer, the term of this patent is extended or adjusted under 35 U.S.C. 154(b) by 277 days.

(21) Appl. No.: 12/876,113

(22) Filed: Sep. 4, 2010

Related U.S. Application Data

(60) Provisional application No. 61/239,794, filed on Sep. 4, 2009.

(51) Int. Cl.
  *G06F 12/00* (2006.01)
  *G06F 13/16* (2006.01)
  *G06F 12/02* (2006.01)

(52) U.S. Cl.
  CPC .............. *G06F 13/16* (2013.01); *G06F 12/02* (2013.01); *G06F 12/0246* (2013.01)

(58) Field of Classification Search
  CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
  See application file for complete search history.

(56) References Cited

U.S. PATENT DOCUMENTS

| 4,752,871 A | 6/1988 | Sparks |
| 5,222,046 A | 6/1993 | Kreifels et al. |
| 5,297,148 A | 3/1994 | Harari et al. |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |

(Continued)

FOREIGN PATENT DOCUMENTS

| JP | 2005-309847 | 11/2005 |
| WO | WO 94/06210 | 3/1994 |

OTHER PUBLICATIONS

Office Action mailed Oct. 8, 2013 for U.S. Appl. No. 13/890,229.

(Continued)

*Primary Examiner* — Jared Rutz
*Assistant Examiner* — Jean Edouard
(74) *Attorney, Agent, or Firm* — Stephen Uriarte

(57) ABSTRACT

The present invention pertains to a multi-profile memory controller and devices that use multi-profile memory controllers. More particularly, the present invention pertains to a multi-profile memory controller and related methods and systems that can operate with memory locations, memory devices, or both which are associated with different memory attributes, different attribute qualifiers, or the like, while minimizing or avoiding some or all of the disadvantages of the prior art.

101 Claims, 4 Drawing Sheets

(56) References Cited

U.S. PATENT DOCUMENTS

| | | | |
|---|---|---|---|
| 5,485,595 A | 1/1996 | Assar et al. | |
| 5,488,711 A | 1/1996 | Hewitt et al. | |
| 5,500,826 A | 3/1996 | Hsu et al. | |
| 5,509,134 A | 4/1996 | Fandrich et al. | |
| 5,513,138 A | 4/1996 | Manabe et al. | |
| 5,524,231 A | 6/1996 | Brown | |
| 5,530,828 A | 6/1996 | Kaki et al. | |
| 5,535,328 A | 7/1996 | Harari et al. | |
| 5,535,356 A | 7/1996 | Kim et al. | |
| 5,542,082 A | 7/1996 | Solhjell | |
| 5,548,741 A | 8/1996 | Watanabe | |
| 5,559,956 A | 9/1996 | Sukegawa | |
| 5,568,423 A | 10/1996 | Jou et al. | |
| 5,568,439 A | 10/1996 | Harari | |
| 5,572,466 A | 11/1996 | Sukegawa | |
| 5,594,883 A | 1/1997 | Pricer | |
| 5,602,987 A | 2/1997 | Harari et al. | |
| 5,603,001 A | 2/1997 | Sukegawa et al. | |
| 5,606,529 A | 2/1997 | Honma et al. | |
| 5,606,532 A | 2/1997 | Lambrache et al. | |
| 5,619,470 A | 4/1997 | Fukumoto | |
| 5,627,783 A | 5/1997 | Miyauchi | |
| 5,640,349 A | 6/1997 | Kakinuma et al. | |
| 5,644,784 A | 7/1997 | Peek | |
| 5,737,742 A | 4/1998 | Achiwa et al. | |
| 5,802,554 A | 9/1998 | Caceres et al. | |
| 5,819,307 A | 10/1998 | Iwamoto et al. | |
| 5,822,251 A | 10/1998 | Bruce et al. | |
| 5,875,351 A | 2/1999 | Riley | |
| 5,881,264 A | 3/1999 | Kurosawa | |
| 5,913,215 A * | 6/1999 | Rubinstein et al. | 707/708 |
| 5,918,033 A | 6/1999 | Heeb et al. | |
| 5,943,421 A | 8/1999 | Grabon | |
| 6,000,006 A | 12/1999 | Bruce et al. | |
| 6,215,875 B1 | 4/2001 | Nohda | |
| 6,230,269 B1 | 5/2001 | Spies et al. | |
| 6,298,071 B1 | 10/2001 | Taylor et al. | |
| 6,363,441 B1 | 3/2002 | Beniz et al. | |
| 6,363,444 B1 | 3/2002 | Platko et al. | |
| 6,404,772 B1 | 6/2002 | Beach et al. | |
| 6,526,506 B1 | 2/2003 | Lewis | |
| 6,529,416 B2 | 3/2003 | Bruce et al. | |
| 6,557,095 B1 | 4/2003 | Henstrom | |
| 6,857,076 B1 | 2/2005 | Klein | |
| 6,901,499 B2 | 5/2005 | Aasheim et al. | |
| 6,961,805 B2 * | 11/2005 | Lakhani et al. | 711/5 |
| 6,970,446 B2 | 11/2005 | Krischer et al. | |
| 6,980,795 B1 | 12/2005 | Hermann et al. | |
| 7,103,684 B2 | 9/2006 | Chen et al. | |
| 7,174,438 B2 | 2/2007 | Homma et al. | |
| 7,194,766 B2 | 3/2007 | Noehring et al. | |
| 7,283,629 B2 | 10/2007 | Kaler et al. | |
| 7,305,548 B2 | 12/2007 | Pierce et al. | |
| 7,330,954 B2 * | 2/2008 | Nangle | 711/170 |
| 7,372,962 B2 | 5/2008 | Fujimoto et al. | |
| 7,500,063 B2 | 3/2009 | Zohar et al. | |
| 7,620,748 B1 | 11/2009 | Bruce et al. | |
| 7,660,941 B2 | 2/2010 | Lee et al. | |
| 7,716,389 B1 | 5/2010 | Bruce et al. | |
| 7,743,202 B2 | 6/2010 | Tsai et al. | |
| 7,765,359 B2 | 7/2010 | Kang et al. | |
| 7,934,052 B2 | 4/2011 | Prins et al. | |
| 8,200,879 B1 * | 6/2012 | Falik et al. | 710/307 |
| 8,375,257 B2 | 2/2013 | Hong et al. | |
| 8,447,908 B2 | 5/2013 | Bruce et al. | |
| 8,510,631 B2 | 8/2013 | Wu et al. | |
| 8,560,804 B2 | 10/2013 | Bruce et al. | |
| 8,707,134 B2 | 4/2014 | Takahashi et al. | |
| 8,713,417 B2 | 4/2014 | Jo | |
| 8,788,725 B2 | 7/2014 | Bruce et al. | |
| 2001/0010066 A1 * | 7/2001 | Chin et al. | 711/108 |
| 2002/0073324 A1 | 6/2002 | Hsu et al. | |
| 2002/0083262 A1 | 6/2002 | Fukuzumi | |
| 2002/0141244 A1 | 10/2002 | Bruce et al. | |
| 2003/0163624 A1 | 8/2003 | Matsui et al. | |
| 2003/0182576 A1 | 9/2003 | Morlang et al. | |
| 2003/0204675 A1 | 10/2003 | Dover et al. | |
| 2003/0223585 A1 | 12/2003 | Tardo et al. | |
| 2004/0128553 A1 | 7/2004 | Buer et al. | |
| 2006/0095709 A1 * | 5/2006 | Achiwa | 711/173 |
| 2006/0184723 A1 * | 8/2006 | Sinclair et al. | 711/103 |
| 2007/0019573 A1 | 1/2007 | Nishimura | |
| 2007/0028040 A1 | 2/2007 | Sinclair | |
| 2007/0083680 A1 | 4/2007 | King et al. | |
| 2007/0130439 A1 | 6/2007 | Andersson et al. | |
| 2007/0174493 A1 | 7/2007 | Irish et al. | |
| 2007/0174506 A1 * | 7/2007 | Tsuruta | 710/22 |
| 2007/0195957 A1 * | 8/2007 | Arulambalam et al. | 380/277 |
| 2009/0094411 A1 * | 4/2009 | Que | 711/103 |
| 2009/0158085 A1 * | 6/2009 | Kern et al. | 714/6 |
| 2009/0172250 A1 | 7/2009 | Allen et al. | |
| 2009/0172466 A1 | 7/2009 | Royer et al. | |
| 2011/0113186 A1 | 5/2011 | Bruce et al. | |
| 2011/0161568 A1 | 6/2011 | Bruce et al. | |
| 2011/0167204 A1 * | 7/2011 | Estakhri et al. | 711/103 |
| 2011/0202709 A1 | 8/2011 | Rychlik | |
| 2011/0264884 A1 | 10/2011 | Kim | |
| 2013/0246694 A1 | 9/2013 | Bruce et al. | |
| 2014/0104949 A1 | 4/2014 | Bruce et al. | |

OTHER PUBLICATIONS

Notice of Allowability (and Examiner's Comment) mailed May 30, 2013 for U.S. Appl. No. 12/882,059.
Notice of Allowability (and Examiner's Comment and Statement of Reasons for Allowance) mailed Feb. 14, 2013 for U.S. Appl. No. 12/882,059.
Office Action mailed May 11, 2012 for U.S. Appl. No. 12/882,059.
Notice of Allowability (and Examiner's Comment and Statement of Reasons for Allowance) mailed Jan. 7, 2013 for U.S. Appl. No. 12/876,247.
Office Action mailed Sep. 14, 2012 for U.S. Appl. No. 12/876,247.
Office Action mailed Feb. 1, 2012 for U.S. Appl. No. 12/876,247.
USPTO Notice of Allowability & attachment(s) mailed Jan. 7, 2013 for U.S. Appl. No. 12/876,247.
Office Action mailed Dec. 18, 2013 for U.S. Appl. No. 12/270,626.
Office Action mailed Mar. 15, 2013 for U.S. Appl. No. 12/270,626.
Office Action mailed Aug. 23, 2012 for U.S. Appl. No. 12/270,626.
Office Action mailed Feb. 3, 2012 for U.S. Appl. No. 12/270,626.
"Security Comes to SNMP: The SNMPv3 Proposed Internet Standards" http://www.cisco.com. vol. 3 No. 3, 8 pages.
Office Action mailed Oct. 5, 2011 for U.S. Appl. No. 12/270,626.
Office Action mailed Apr. 4, 2011 for U.S. Appl. No. 12/270,626.
Office Action for U.S. Appl. No. 13/253,912 mailed on Jul. 16, 2014.
Office Action for U.S. Appl. No. 13/475,878 mailed on Jun. 23, 2014.
Office Action for U.S. Appl. No. 12/876,113 mailed on Jul. 11, 2014.
Office Action for U.S. Appl. No. 12/876,113 mailed on Oct. 16, 2014.
Notice of Allowance for U.S. Appl. No. 12/270,626 mailed Oct. 3, 2014.
Notice of Allowance for U.S. Appl. No. 14/038,684 mailed Nov. 3, 2014.
Notice of Allowance/Allowability for U.S. Appl. No. 14/038,684 for Aug. 1, 2014.
Office Action for U.S. Appl. No. 14/038,684 mailed on Mar. 17, 2014.
Notice of Allowance/Allowability for U.S. Appl. No. 13/890,229 mailed on Feb. 20, 2014.
Office Action for U.S. Appl. No. 12/270,626 mailed on May 23, 2014.

* cited by examiner

FIG. 2A

| | 24 | 25 |
|---|---|---|
| Page Size | 16 | (# of pages) |
| Block Size | 18 | (# of blocks) |
| Memory Protocol | 20 | (Protocol Type Supported) |
| Mem. Dev. Type | 22 | (Mem. Type) |
| Partial Page Size | 23 | (# of pages) |

FIG. 2B

| | 26 | |
|---|---|---|
| Page Size | 28 | 1024 |
| Block Size | 30 | 2048 |
| Memory Protocol | 32 | ONFi |
| Mem. Dev. Type | 34 | NAND Flash |
| Partial Page Size | 36 | 512 |

FIG. 2C

| | 38 | |
|---|---|---|
| Page Size | 40 | 512 |
| Block Size | 42 | 8192 |
| Memory Protocol | 44 | ONFi |
| Mem. Dev. Type | 46 | NAND Flash |
| Partial Page Size | 48 | 256 |

MULTI-PROFILE MEMORY CONTROLLER FOR COMPUTING DEVICES

CROSS-REFERENCE(S) TO RELATED APPLICATIONS

This application claims the benefit of United States Provisional Application, entitled "Multi-Profile Memory Controller for Computing Devices", filed on 4 Sep. 2009 and having Ser. No. 61/239,794, which is hereby incorporated by reference as if fully set forth herein.

BACKGROUND (1) Technical Field

The present invention relates to multi-profile memory controllers and computing devices, such as solid-state storage devices, that use these multi-profile memory controllers.

(2) Background Art

Multi-profile memory controllers have been traditionally designed to operate with memory stores or modules that comprise of memory devices which use the same memory device characteristics, such as block size. Some of these multi-profile memory controllers are disposed to operate with memory devices that use flash memory cells which utilize relatively large block sizes, such as 128 Kb or greater. Flash memory devices that have a relatively large block size generally provide better sequential memory access performance than flash memory devices that have a relatively small block size. Larger block sizes are commonly employed because flash memory devices that are disposed with larger block sizes tend to exhibit greater memory density than flash memory devices that use smaller block sizes. In addition, these higher density flash memory devices tend to be generally more cost effective than flash memory devices with less memory density.

A multi-profile memory controller that employs flash memory devices that have relatively large block sizes incurs some disadvantages, however, because it suffers from relatively higher read-modify-write cycle latency, higher random memory access latency and lower random IOPS (input/output operations per second). Consequently, there is a need for a multi-profile memory controller that can operate with memory locations, memory devices, or both that are associated with different memory attributes, different attribute qualifiers, or the like, while minimizing or avoiding some or all of the above described disadvantages.

SUMMARY

The present invention pertains to a multi-profile memory controller and devices that use multi-profile memory controllers. More particularly, the present invention pertains to a multi-profile memory controller and related methods and systems that can operate with memory locations, memory devices, or both which are associated with different memory attributes, different attribute qualifiers, or the like, while minimizing or avoiding some or all of the disadvantages of the prior art.

BRIEF DESCRIPTION OF THE DRAWINGS

FIGS. 2A-2C illustrate device profiles for use with a multi-profile memory controller in accordance with yet another embodiment of the present invention;

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Figure 1:
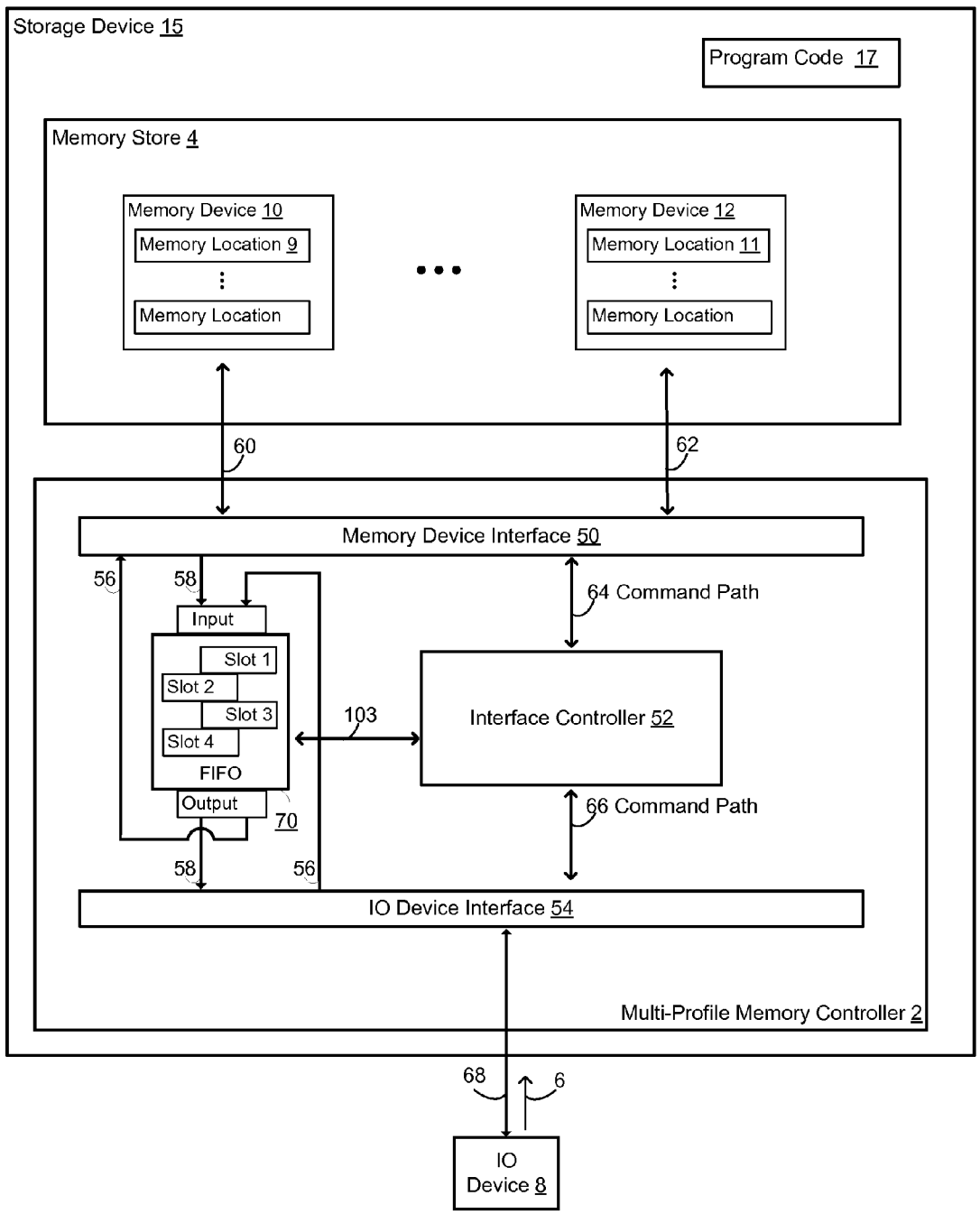
FIG. 1 illustrates a multi-profile memory controller, which is disposed to receive and process memory transaction requests from a host, in accordance with one embodiment of the present invention.

The present invention relates to multi-profile memory controllers and computing devices that use these multi-profile memory controllers, such as storage devices, computers, and other types of devices that use memory. More particularly, the present invention relates to a multi-profile memory controller disposed to perform memory transactions using different device profiles. This type of multi-profile memory controller may be referred to herein as a "multi-profile memory controller". In accordance with one embodiment of the present invention, FIG. 1 illustrates a multi-profile memory controller 2 for performing a memory transaction on a memory store 4 in response to receiving a memory transaction request 6. Memory transaction request 6 may be initiated by an IO device, such as IO device 8, or other device disposed to initiate such a request. Memory store 4 may be part of a computing device or equivalent device, such as storage device 15, that includes multi-profile memory controller 2. In the example shown, multi-profile memory controller 2 executes computer or machine executable instructions, such as program code 17, which enables multi-profile memory controller 2 to manage, control or both the flow of data between IO device 8 and memory store 4.

Memory store 4 includes addressable memory locations, such as memory locations 9 and 11, that are respectively associated with a set of at least one memory attribute. The term "memory attribute", which may also be referred to as "attribute" herein, is defined to include a characteristic of a memory location that is related to accessing or addressing the memory location. For example, an attribute that is associated with a particular memory location may include the memory device type of a memory device in which the memory location is located or addressable, or of a memory device associated with a memory space in which the memory location is subset. In FIG. 1, memory locations 9 and 11 are located or addressable in memory devices 10 and 12, respectively. Other examples of an attribute of a memory location may include, where applicable, the block size used by the memory device, the page size used by the memory device, the memory protocol or specification supported by the memory device, and the partial page size used by the memory device.

In one embodiment of the present invention, each set of memory attributes may be organized into a device profile. Each attribute kept in a device profile is associated with data, named "attribute qualifier," that qualifies the attribute, such as an attribute value or attribute type. The association between an attribute and its corresponding attribute qualifier may be accomplished by using any known means, such as by using a database, a table, index, or an equivalent device, that is accessible to multi-profile memory controller 2. For example, device profile 14 in FIG. 2A may be used to represent at least one attribute 24 of a memory location, and each attribute respectively corresponds to an attribute qualifier 25. These attributes include a page size 16, a block size 18, a memory protocol 20 supported by the memory device in which the memory location is addressable, a memory device type 22, and a partial page size 23. Attribute qualifier 25 is in the form of a value or type. In FIG. 2A, attribute page size 16 corresponds to an attribute value in bytes per page, attribute block size 18 corresponds to an attribute value in pages per block, attribute memory protocol 20 corresponds to a memory device specification or protocol supported by the memory device associated with the memory location, attribute memory device type 22 corresponds to a memory device type of the memory device associated with the memory location, attribute partial page size 23 corresponds to an attribute value in bytes per partial page.

Referring to FIGS. 1 and 2B for example, memory location 9 in memory store 4 may have a device profile 26 that includes the following attributes: a page size 28 associated with an attribute value of 1024 bytes, a block size 30 associated with an attribute value of 2048 pages, a memory protocol 32 associated with an attribute type that represents the ONFi specification, a memory device type 34 associated with an attribute type that represents a NAND flash memory device, and a partial page size 36 associated with an attribute value of 512 bytes. In another example as shown in FIG. 2C, memory location 11 in memory store 4 may have a device profile 38 that includes the following attributes: a page size 40 associated with an attribute value of 512 bytes, a block size 42 associated with an attribute value of 8192 pages, a memory protocol 44 associated with an attribute type that represents the ONFi protocol, a memory device type 46 associated with an attribute type that represents a NAND flash memory device, and a partial page size 48 associated with an attribute value of 256 bytes.

A device profile may have any number of attributes, while any two device profiles may have any number of shared attributes equal to or greater than zero. Multi-profile memory controller 2 can perform memory transactions using different device profiles. In this example, memory locations 9 and 11 have different device profiles. Memory locations that are addressable from the same memory device may share the same device profile although this approach is not intended to be limiting in any way. In another embodiment, different device profiles may be respectively associated with different memory locations that are addressable from the same memory device but which have different attributes, shared attributes having different attribute qualifiers, or both. Device profiles are different if they differ by attribute, by number of attributes, by attribute qualifier for shared attributes, or any combination of these. Shared attributes include at least two attributes that are the same. In FIGS. 2B and 2C, device profiles 26 and 38 have the following shared attributes: a page size, block size, memory device type, memory protocol, and partial page size. In the example shown, device profiles 26 and 38 neither differ by their number of attributes nor by their attributes but differ by attribute qualifier for their sets of shared attributes. Specifically, page sizes 28 and 40; block sizes 30 and 42, and partial page sizes 36 and 48 differ by their attribute values, while memory protocols 32 and 44, and memory device types 34 and 46 differ by their attribute types. In another embodiment (not shown), device profiles 26 and 38 may have the same attributes but at least one set of shared attributes differs by an attribute qualifier, such an attribute value or attribute type. In yet another embodiment (not shown) device profiles 26 and 38 have a different number of attributes. These alternative embodiments are not intended to be exhaustive but are provide to illustrate the variety in which device profiles may differ.

The type and location of a memory device or memory store used to store device profiles are not intended to limit the scope of the invention in any way. In the example shown in FIG. 1, the device profiles 26 and 38 for memory locations 9 and 11 are stored in memory store 4. In an alternative embodiment, device profiles 26 and 38 may be stored in another type of non-volatile memory, such as an EPROM, battery-backed volatile memory, or their respective equivalent, which is not shown to avoid overcomplicating this disclosure. The term "memory device" refers to any type of memory device that can write to or read data from an addressable location in response to a memory device command, such as a read or write command. For example, memory devices 10 and 12 may be each disposed to be in the form of a NAND flash memory device integrated circuit, sometimes referred to as a flash chip. Using a NAND flash memory device is not intended to be limiting in any way, and any form of non-volatile memory, such as a NOR flash memory device, may be used. A NAND flash memory device includes a set of addressable non-volatile memory cells, named flash blocks, and each memory cell may be single or multi-level.

A flash memory device permits memory operations, such as a write or read operation, to be performed on these flash blocks according to a protocol supported by the flash memory device. Memory device 10 and 12 may each be implemented using a NAND flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash memory device that complies with the ONFI Specification is not intended to limit the embodiment disclosed. One of ordinary skill in the art having the benefit of this disclosure would readily recognize that other types of flash memory devices employing different device interface protocols may be used, such as protocols compatible with the standards created through the Non-Volatile Memory Host Controller Interface ("NVMHCI") working group. Members of the NVMHCI working group include Intel Corporation of Santa Clara, Calif., Dell Inc. of Round Rock, Tex. and Microsoft Corporation of Redmond, Wash.

Memory store 4 is not intended to be limited to flash memory devices, and may include other types of memory devices, such as volatile memory like SRAM or DRAM; non-volatile memory, such as a NOR flash memory device or battery-backed volatile memory; a hard disk drive; and the like. The term "IO device" is intended to cover a broad range of devices that can request a memory transaction, such as a read or write transaction. For example, a computing system or computing-enabled device that is configured to include the function of requesting a memory transaction from memory store 4 is an IO device for purposes of this disclosure. An IO device may or may not have the capability to map data that is subject to a memory transaction request in a memory map table. This data may include a file or data portions of the file. IO memory mapping and memory tables are known and thus, are not further described herein. An IO device may also be referred to herein as a "host".

In FIG. 1, multi-profile memory controller 2 may be configured to include a memory device interface 50, an interface controller 52 and an IO device interface 54. Communication path 64 couples memory device interface 50 with interface controller 52, while communication path 66 couples interface controller 52 with IO device interface 54, which enables these coupled devices to assert or transmit signals across their respective communication paths. Interface controller 52 and memory device interface 50 communicate through communication bus 64. Communication through communication path 64 includes interface controller 52 sending information, such as command details, to memory device interface 50 and receiving status from memory device interface 50. In addition, interface controller 52 communicates with IO device interface 54 though communication path 66. Communication through communication path 66 includes interface controller 52 receiving status and request information from IO device interface 54 and sending commands to IO device interface 54. Communication paths 64 and 66 may be implemented in the form of a bus that includes control or command lines. A set of control or command lines are sometimes generically referred to as a control bus or a command line bus, respectively.

Data Paths 56 & 58

At least one data path, such as data paths 56 and 58, are used to couple IO device interface 54 with memory device interface 50, enabling these devices to transfer data, such as data that will be read from or written to memory store 4, with each other. In one embodiment of the present invention, data paths 56 and 58 may be implemented logically by using a single FIFO buffer 70, named "FIFO". FIFO 70 includes a set of queue slots and may be used to provide more than one logical data path by associating certain queue slots as a particular data path. For example, all odd numbered queue slots in FIFO 70 may be designated as one data path, such as data path 56, while all even numbered queue slots in FIFO 70 another data path, such as data path 58. Interface controller 52 is also coupled to FIFO 70 to provide FIFO status to memory device interface 50 and IO device interface 54. When implemented in this manner, FIFO 70 functions as a logical form of data paths 56 and 58 because although a single instance of FIFO is used, it provides two logical data paths through which data may be transferred between memory device interface 50 and IO device interface 54. In another embodiment of the present invention, data paths 56 and 58 may each be implemented separately in the form of a FIFO, respectively. Each FIFO (not shown) may be used to queue data transferred between memory device interface 50 and IO device interface 54 with interface controller providing FIFO status to memory device interface 50 and IO device interface 54.

Data paths 56 and 58, whether implemented logically or physically, may be used as bi-directional or unidirectional data paths. When used as a bi-directional data path, data may travel in both directions. For example, bi-directional data path 56, data path 58 or both may be used to transfer both read and write data. When used as a one way data path, data may travels only in one direction on a particular data path. For example, data path 56 may be used solely to transfer data from IO device interface 54 to memory device interface 50, while data path 58 may be used solely to transfer data from memory device interface 50 to IO device interface 54. FIG. 1 illustrates an embodiment of multi-profile memory controller 2 that uses FIFO 70 configured to provide unidirectional data paths 56 and 58 in logical form.

Memory Buses 60 & 62

Memory device interface 50 is coupled to memory store 4 through at least one bus, such as buses 60 and 62. Buses 60 and 62 are shown respectively coupled to memory devices 10 and 12. The number of memory buses used to couple multi-profile memory controller 2 to memory devices associated with memory store 4 is not intended to be limiting. More than one memory device may be coupled to memory device interface 50. The means and method of selecting a memory device or addressing a memory location from a set of memory devices by using a single memory bus are known. For example, select lines (not shown) may be used. In addition, the number of data buses or FIFOs used is also not intended to be limiting. As would be evident to one of ordinary skill having the benefit of this disclosure, using more than one data bus, FIFO, or both, increases the available pathways through which data may be transmitted between IO device interface 54 and memory device interface 50.

Memory device interface 50 operates as the communication interface between memory store 4 and devices that form part of multi-profile memory controller 2, such as interface controller 52 and IO device interface 54. Memory device interface 50 monitors the availability of a memory device that has been targeted for a memory device operation, and routes commands and data between multi-profile memory controller 2 and the memory device, such as memory device 10 or 12. Memory device interface 50 also provides the required physical signaling, such as by asserting electrical signals on memory bus 60, memory bus 62, or both, that will enable memory device interface 50 to use the memory bus to transfer commands and data associated with the memory device operation.

Memory Device Interface 50

Memory device interface 50 is responsive to commands received from interface controller 52 via a suitable communication path or bus, such as communication path 64, which enables interface controller 52 to perform a memory transaction operation, such as a read or write memory operation on a selected memory device, such as memory device 10 or 12. Data associated with this read or write memory operation is transferred between memory device interface 50 and IO device interface 54 via at least one data path, such as data path 56, data path 58 or both. In the examples shown in FIGS. 1 and 2B-2C, memory device interface 50 supports the ONFi memory protocol, which renders it compatible with memory device 10 and 12 since they are NAND flash memory devices that support the ONFi memory protocol.

IO Device Interface 54

IO device interface 54 operates as the communication interface between an IO device, such as IO device 8, and devices that form part of multi-profile memory controller 2, such as memory device interface 50 and interface controller 52. IO device interface 54 enables multi-profile memory controller 2 and IO device 8 to communicate with each other through a protocol supported by both devices, enabling multi-profile memory controller 2 to receive a memory transaction request 6 that was sent by IO device 8 through a suitable communication pathway, such as communication bus 66. The type of protocol used is not intended to be limiting in any way although this protocol should be supported by IO device interface 54 and any IO device that is selected to operate with IO device interface 54. IO device interface 54 also provides the required physical signaling, such as by asserting electrical signals on communication path 68, that will enable IO device interface 54 to use path 68 when communicating with an IO device, such as by receiving memory transaction request 6. The number of IO devices through which IO device interface can communicate is not intended to be limiting in any way.

Operation

After receiving memory transaction request 6 from an IO device, IO device interface 54 transfers this request to interface controller 52 through communication path 66. Interface controller 52 processes memory transaction request 6 by interpreting the memory transaction request and performing a memory transaction on a memory location. Performing a memory transaction includes addressing a memory location that is associated with a device profile, and that is located in or addressable in a memory device. The addressing of this memory location by interface controller 52 may be part of the memory read or write transaction indicated in the memory transaction request. Interpreting memory transaction request 6 includes determining whether the memory transaction pertains to a memory read or a memory write transaction, and identifying an address from the memory transaction request. In the embodiment shown, this identified address is a logical address, and interface controller 52 translates this logical address into a physical address, which points to the memory location, which may also be referred to herein as "target memory location". The manner of translating a logical address to a physical address is also not intended to be limiting in any way. Any method may be used that is commonly known by those of ordinary skill in the art. For example, a logical to physical address memory map that maps each logical address to target memory locations may be used. In addition, more than one physical address may be mapped to a single logical address. In the embodiment shown in FIG. 1, if multiple physical addresses or target memory locations are mapped to a single logical address, all of these target memory locations are associated with the same device profile although this arrangement is not intended to limit the scope or spirit of the herein invention in any way. Thus, in this particular non-limiting embodiment, for each memory transaction requested, multi-profile memory controller 2 can perform memory operations on more than one memory location. These memory locations are associated with device profiles that are either the same, or at the very least have at least one shared attribute in common that have the same attribute qualifier. For example, these memory locations may have device profiles that have a shared attribute of block size and the same block size attribute value.

Interface controller 52 also determines command details necessary to cause the interpreted memory transaction to be performed by multi-profile memory controller 2 through its components. These command details include the memory device from which the target memory location is addressable by a multi-profile memory controller component, such as memory device interface 50. This memory device may also be referred to herein as a "target memory device". In one embodiment of the present invention, multi-profile memory controller 2 through interface controller 52 uses a memory map (not shown) that associates memory devices with physical addresses. Multi-profile memory controller 2 also determines the transfer sizes to use when causing a memory transaction to be performed on the target memory device.

After identifying these command details, the multi-profile memory controller obtains attributes from the device profile associated with the target memory location, and determines whether the target memory location is available by causing memory device interface 50 to determine the status of the target memory device and to inform interface controller 52 when this target memory device is ready for a memory operation. When the target memory device is ready, multi-profile memory controller 2 performs the memory transaction by causing memory device interface 50 to perform a memory operation on the target memory location and target memory device. Multi-profile memory controller 2 also causes data to be transferred via at least one suitable bus or communication path, such as data paths 56 and 58, to the target memory location and the target memory device from IO device interface 54 if the memory transaction request pertains to a memory write transaction, or from the target memory location and the target memory device to IO device interface 54 if the memory transaction request pertains to a memory read transaction.

In FIG. 1 for example, if the logical address translates to a physical address pointing to memory location 9 in memory device 10, multi-profile memory controller 2 instructs memory device interface 50 to check the status of memory device 10. When multi-profile memory controller 2 through memory device interface 50 detects that memory device 10 is ready for a memory transaction, multi-profile memory controller 2 through interface controller 52 provides the instructions necessary for causing memory device interface 50 to perform at least one memory operation as required by the memory transaction requested by memory transaction request 6.

In one embodiment of the present invention, the transfer size selected is a function of the data size of the subject to memory transaction request 6, and the attributes in a device profile associated with a target memory location. These attributes may include any combination of the following: the page size attribute, the block size attribute, and the partial page size attribute in device profile 26 of memory location 9 although this example is not intended to be limiting in any way. Any transfer size can be selected using any method and more than one transfer size can be used for memory transactions that require multiple transfers arising from more than one memory operation. In addition, for illustration purposes only and in one example embodiment, if the data size is greater than the page size attribute value in device profile 26, multi-profile memory controller 2 uses a transfer size equal to at least the page size attribute value for each memory operation transfer for the memory transaction requested until the remaining data not yet transferred from a requesting IO device is less than the page size attribute. In this case, multi-profile memory controller 2 can then use a partial page size attribute value for the transfer size of the next memory operation transfer until all of the data has been transferred to memory location 9. If the data size is greater than the block size attribute value in device profile 24, multi-profile memory controller 2 uses a transfer size equal to at least the block size attribute value for each memory operation transfer for the memory transaction requested until the remaining data not yet transferred is less than the block size attribute value. If the remaining data not yet transferred reduces to less than the block size attribute value, multi-profile memory controller 2 then selects a transfer size equal to the page size attribute value if this remaining data has a data size, named "remaining data size", that is at least equal to the page size attribute, or equal to the partial page size attribute value if this remaining data size is less than the page size attribute.

In another example, by using a multi-profile memory controller 2, which supports memory locations that have different device profiles, a host or IO device, such as IO device 8, can use a logical address that maps to at least one target memory location that is associated with a device profile that is optimal for the type of data subject to a memory transaction request initiated by IO device 8, and another target memory location that is associated with another device profile that is optimal for the type of data subject to another memory transaction request initiated by IO device 8. IO device 8 may use a memory write transaction request that uses a logical address that maps to at least one target memory location that is associated with a device profile that includes a block size attribute value that is the largest available from the other device profiles associated with a set of memory locations available for addressing by multi-profile memory controller 2. This transaction command detail may be desired if the data subject to the memory transaction request is of a sequential type, and the memory type attribute value also associated with the device profile is a NAND flash memory device.

In yet another example, IO device 8 may use a memory transaction request that uses a logical address that maps to at least one target memory location which is associated with a device profile that includes a block size attribute value that is the smallest available from the other device profiles associated with a set of memory locations available for addressing by multi-profile memory controller 2. This transaction command detail may be desired if the data subject to the memory transaction request is random nature. In yet another further example, IO device 8 may use a memory transaction request that uses a logical address that maps to at least one target memory location that is associated with a device profile that includes a partial page size attribute value. This transaction command detail may be desired if the data subject to the memory transaction request is random in nature, and if the data size of the data subject to the write transaction is at most equal to the partial page size attribute value. The above examples are not intended to be limiting in any way. For instance, instead of IO device 8, multi-profile memory controller 2 includes program code or uses a memory map that determines or causes which target memory location is used to support a memory transaction for a particular data type.

Figure 3:
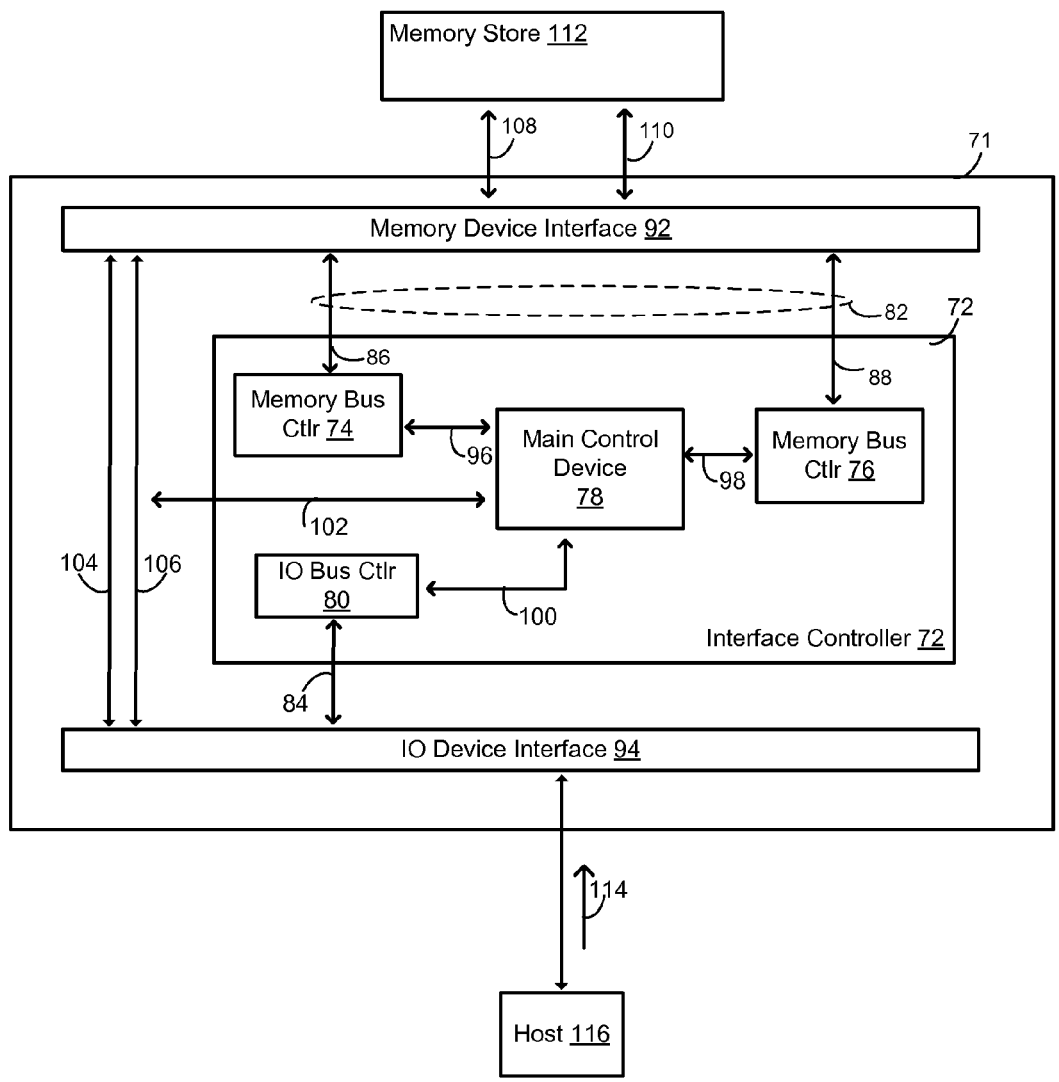
FIG. 3 illustrates a multi-profile memory controller in accordance with yet another embodiment of the present invention.

Referring now to FIG. 3, another embodiment of a multi-profile memory controller 71 is illustrated. Multi-profile memory controller 71 includes an interface controller 72 that may be implemented using a set of memory bus controllers, such as memory bus controller 74 and 76, a main control device 78, an IO bus controller 80, communication paths 82 and 84, and a control path 102. Communication path 82 includes control paths 86 and 88, which are used by memory bus controllers 74 and 76 and main control device 78, respectively, to assert commands and certain information on a memory device interface 92, such as the physical or actual address of a memory location targeted for a memory transaction, and commands supported by the memory devices, such as commands supported by ONFi compliant memory devices. For instance, a value of 70 h is a request for status from a memory device by a memory bus controller, while 80 h is commands a memory device to write the data asserted on an address line coupled to the memory device. In the embodiment disclosed in FIG. 3, the commands, information, memory and device status are routed to main control device 78 via control path 86 or 88 and communication path 96 or 98 by memory bus controllers, such as 74 or 76, respectively, depending on which memory bus controller is associated with the memory device providing the memory device status. Although as further described below, main control device 78 determines whether a target memory location is available, a memory bus controller performs the transfer of this availability status from the target memory location to main control device 78.

Each memory bus controller is disposed to access memory devices and to load the selected flash profile attributes as part of a memory read or memory write transaction. In accordance with one embodiment of the present invention, the memory devices in memory store 112 are grouped so that each of these memory devices are associated with only one memory bus controller, such as memory bus controller 74 or 76. Associating each memory device with only one memory bus controller permits simultaneous memory device accesses that equal in number to the memory bus controllers used by interface controller 72. In FIG. 3, interface controller 72 includes two (2) memory bus controllers but the number of memory bus controllers is not intended to be limiting in any way, and any number of memory bus controllers may be employed. For instance, (not illustrated), interface controller 72 may be disposed with four (4) memory bus controllers, which permits each of these memory bus controllers to access collectively a maximum of four memory devices simultaneously.

Communication path 84 couples interface controller 72 with IO device interface 94, enabling main control device 78 to receive status from IO device interface 94 via IO bus controller 80. Communication paths 96 and 98 enable main control device 78 to communicate with memory bus controllers 74 and 76, respectively, while communication path 100 enables main control device 78 to communicate with IO bus controller 80. IO bus controller 80 functions as the controller for IO Device Interface 94, and enables main control device 78 to receive status and request information from IO device interface 94 and to send commands to IO device interface 94.

Control path 102 couples main control device 78 with data paths that are used by memory device interface 92 and IO device interface 94 to transfer data between each other, such as bidirectional data paths 104 and 106. Main control device 78 uses control path 102 to associate data transferred on a bidirectional data path 104 or 106 with commands sent by a particular memory bus controller, such as memory bus controller 74 or 76. Bidirectional data paths 104 or 106 may be implemented in to have substantially the same form and function as unidirectional data paths 56 and 58 previously discussed with respect to FIG. 1 above. In addition, although FIG. 3 illustrates two bidirectional data paths 104 and 106, any number of bidirectional data paths may be employed.

Memory buses 108 and 110 couple memory device interface 92 to at least two memory locations, such as memory locations in memory devices (not shown) that form a memory store 112. These memory buses enable data to be read from or written to a memory device in memory store 112. The number of memory bus controllers used by interface controller 72 is not intended to be limiting in any way although in the example shown in FIG. 3, one memory bus controller may be used for each memory bus supported by multi-profile memory controller 71. Interface controller 72, communication paths 82 and 84, memory device interface 92, IO device interface 94, and control path 102 have substantially the same functionality as interface controller 52, communication paths 64 and 66, control path 103, and memory buses 60 and 62, respectively, disclosed above in FIG. 1.

Main control device 78 functions by receiving status from and by sending commands to memory control bus controllers 74 and 76, data paths 104 and 106 and IO bus controller 80. For example, after receiving a memory transaction request 114 from a host 116 through IO device interface 94 via communication path 84; IO bus controller 80 acknowledges memory transaction request 114 and informs main control device 78 via communication path 100 that a new memory transaction request, such as memory transaction request 114, has been received. Interface controller 72 via main control device 78 interprets this memory transaction and performs the requested memory transaction. Main control device 78 performs the requested memory transaction by using at least one memory bus controller, such as memory bus controllers 74 or 76, to address, via memory device interface 92, a target memory location that is associated with a device profile, and that is located in or addressable in a memory device. The addressing of this memory location may be part of the memory read or write transaction indicated in memory transaction request 114. Main control device 78 interprets memory transaction request 114 by determining whether the memory transaction involves a memory read or a memory write transaction, and identifies an address from the memory transaction request.

In the embodiment shown, this identified address may be a logical address, which is translated by main control device 78 into a physical address, which points the target memory location. Interface controller 72 via main control device 78 also determines the command details necessary to cause the interpreted memory transaction to be performed by multi-profile memory controller 71 through its components. These command details include the memory device (not shown) in memory store 112 that is addressable by a multi-profile memory controller component, such as memory device interface 92. Main control device 78 also determines the transfer sizes to use when causing a memory transaction to be performed on the target memory device.

After identifying these command details, multi-profile memory controller 71 through main control device 78 obtains attributes from the device profile associated with the target memory location, and determines whether the target memory location is available by causing memory device interface 92 to determine or monitor the status of the target memory device and to inform main control device 78 via control path 86 or 88 when this target memory device is ready for a memory operation. If memory device interface 92 indicates that this memory device is ready, main control device 78 performs the memory transaction by causing memory device interface 92 via a memory bus controller, such as 74 or 76, to perform a memory operation on the target memory location and target memory device in memory store 112. Main control device 78 also causes data to be transferred via at least one suitable bus or communication path, such as data paths 104 and 106, to the target memory location and the target memory device from IO device interface 94 if the memory transaction request pertains to a memory write transaction, or from the target memory location and the target memory device to IO device interface 94 if the memory transaction request pertains to a memory read transaction. In the example shown, main control device uses a control path 102 to manage data paths 104 and 106. After memory device interface 92 performs the memory operation on a target memory location, it provides operation status to interface controller 72 via control path 90. Interface controller 72 via main control device 78, in response, sends a memory transaction status to IO device interface 94 via IO bus controller 80, which causes IO device interface 94 to send status to a host.

Figure 4:
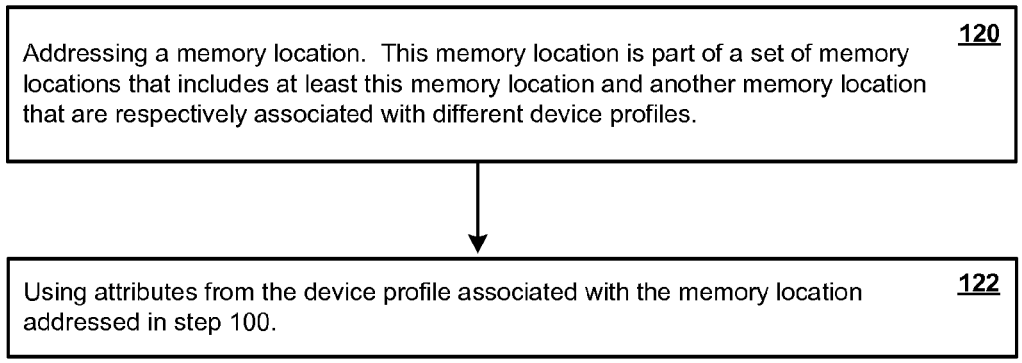
FIG. 4 illustrates a method of performing memory transactions on memory locations that are associated with different device profiles in accordance with yet another embodiment of the present invention.
Figure 5:
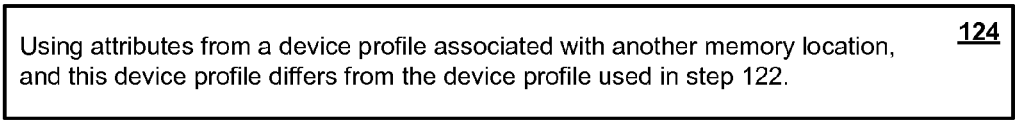
FIG. 5 illustrates a further embodiment of the method illustrated in FIG. 4.

FIG. 4 illustrates a method of performing memory transactions on memory locations that are associated with different device profiles in accordance with yet another embodiment of the present invention. For example, also shown in FIGS. 1 and 2B-2C, these memory locations may be in the form of memory locations 9 and 11, while these different device profiles may be in the form of device profiles 26 and 38. In response to a memory transaction request, such as memory transaction request 6, a memory location is addressed 120. The addressing of this memory location may be addressed by a multi-profile memory controller, such as multi-profile memory controller 2. The addressing of this memory location may be part of a memory transaction indicated in the memory transaction request. The multi-profile memory controller also uses 122 attributes from a device profile associated with the memory location. FIG. 5 illustrates a further embodiment of the method illustrated in FIG. 4. In response to another memory transaction request, the attributes from a device profile that is associated with another memory location and that is different from the device profile used in step 122 is also used 124 by multi-profile memory controller 2. For example, the block attribute value in device profile 12 is used by multi-profile memory controller 2 to perform another memory transaction. For example, multi-profile memory controller 2 selects a transfer size that is equal to the block attribute value, and transfers the data subject to the memory transaction request.

Figure 6:
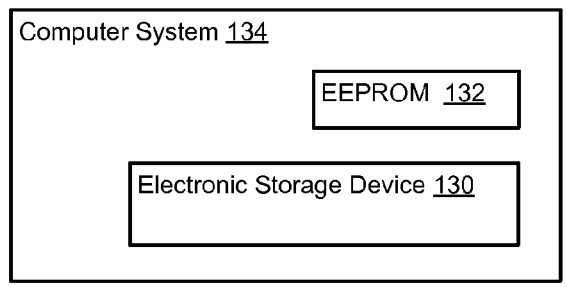
FIG. 6 illustrates a block diagram of a computer system that uses an electronic storage device which employs a multi-profile memory controller to perform one or both of the methods disclosed in FIGS. 4 and 5 above in accordance with yet another embodiment of the present invention.

The methods shown in FIGS. 4 and 5 may be implemented by using the embodiments described herein, such as the embodiments discussed with respect to FIGS. 1 through 2C. In addition, these methods may also be saved onto a computer readable medium, such as flash memory, EEPROM memory, USB memory device (such as a USB flash drive or USB memory key), hard disk drive, and the like, which can be read and executed by a machine, such as by an electronic storage device that employs a multi-profile memory controller. For example in FIG. 6, electronic storage device 130 may be configured to access an EEPROM 132 on which at least one of the above methods is stored in a machine-readable form. In this example, electronic storage device 130 is part of a computer system 134 although this is not intended to be limiting in any way. For example, electronic storage device 130 may be disposed to be function as a stand-alone mass storage device, whether configured as a direct-attached, network-attached storage (NAS), or storage area networking (SAN) device. In addition, the remaining components of computer system 134 is not illustrated to avoid overcomplicating the herein disclosure, and since a computer system that have the capability to access or use an electronic storage device is commonly known by those of ordinary skill in the art.

While the present invention has been described in particular embodiments, it should be appreciated that the present invention should not be construed as limited by such embodiments. Rather, the present invention should be construed according to the claims below.

We claim:

1. A method of performing memory transactions on a set of memory locations that includes a first memory location and a second memory location, the method comprising:
   performing a memory transaction comprising addressing a first memory location in a first memory device in a memory store, said first memory location and a second memory location respectively associated with a first device profile and a second device profile, wherein said second memory location is in a second memory device in the memory store, wherein a memory read transaction or a memory write transaction is performed on at least one of the first memory location or second memory location, wherein data is transferred to the first memory location or second memory location from a host for a memory write transaction, wherein data is transferred from the first memory location or second memory location to the host for a memory read transaction;

wherein said first device profile is optimal for a data type subject to the memory transaction, wherein said data type comprises one of a random data type or a sequential data type;

said performing the memory transaction further comprising identifying command details for causing the memory transaction to be performed, wherein said command details comprising the first memory device;

said first device profile representing a first set of attributes of said first memory location, and said second device profile representing a second set of attributes of said second memory location, and a difference exists between said first and second device profiles;

after identifying the command details, obtaining the first set of attributes;

wherein each attribute in the first set of attributes and second set of attributes is associated with a respective attribute qualifier that qualifies a respective memory location;

wherein the memory store is directly coupled to at least one memory bus and wherein the at least one memory bus is directly coupled to a controller, and wherein the controller performs the memory read transaction and memory write transaction on the memory store;

wherein the host is directly coupled to the controller by a communication path as the controller performs the memory read transaction or memory write transaction;

wherein the first device profile and second device profile are each stored in the memory store; and using attributes from said first and second device profiles; and selecting a transfer size for the memory transaction, wherein the transfer size is a function of a data size of the memory transaction and the first set of attributes.

2. The method of claim 1, wherein said first memory location is located in a first memory device, and said second memory location is located in a second memory device.

3. The method of claim 1, wherein said difference between said first and second device profiles includes different attributes; and said addressing said first memory location is made in response to a first memory transaction request; and further including addressing said second memory location.

4. The method of claim 1, wherein:
said first and second device profiles have at least one set of shared attributes, and said difference between said first and second device profiles includes different attribute qualifiers for said set of shared attributes; and
said using said attributes from said first and second device profiles further includes using said different attribute qualifiers for said shared attributes.

5. The method of claim 1, wherein said difference includes different attribute qualifiers for at least one set of shared attributes from said first and second device profiles.

6. The method of claim 5, wherein said different attribute qualifiers include different attribute values.

7. The method of claim 5, wherein said different attribute qualifiers include different attribute types.

8. The method of claim 5, wherein said shared attributes include a memory device type attribute.

9. The method of claim 5, wherein said shared attributes include a block size attribute, and said different attribute qualifiers include different block size values.

10. The method of claim 5, wherein said shared attributes include a page size attribute and said different attribute qualifiers include different page size values.

11. The method of claim 5, wherein said shared attributes includes any one of the following memory device attributes: partial page size, page size, block size, memory protocol, and memory device type.

12. The method of claim 1, wherein said using attributes from said first and second device profile further includes using a first block size attribute from said first set of attributes that differs in attribute value from a second block size attribute from said second set of attributes.

13. The method of claim 1, wherein said using attributes from said first and second device profile further includes using a first page size attribute from said first set of attributes that differs in value from a second page size attribute from said second set of attributes.

14. The method of claim 1, wherein said using attributes from said first and second device profile further includes using a first memory device interface attribute from said first set of attributes that differs from a second memory device interface attribute from said second set of attributes.

15. The method of claim 14, where said first memory device interface attribute corresponds to a flash memory device, and said second memory device interface attribute corresponds to a DRAM device interface.

16. The method of claim 2, wherein said using attributes from said first and second device profile further includes using a first partial page size attribute from said first set of attributes that differs in value from a second partial page size attribute from said second set of attributes.

17. The method of claim 16:
said using a first partial page size attribute includes performing a write operation on said first memory device by at least using a transfer size at least equal to a value of said first partial page size attribute; and
further including using said second partial page size attribute by at least performing a write operation on said second memory device that includes using a transfer size at least equal to a value of said second partial page size attribute.

18. The method of claim 8, wherein said first memory device type attribute corresponds to a volatile memory disposed to receive backup power from a portable power source.

19. The method of claim 8, wherein said first memory device type attribute corresponds to a NAND flash memory device and said second memory device type attribute corresponds to a NOR flash memory device.

20. The method of claim 2, further including:
using an address corresponding to a memory location from said first memory device and transferring a first data set, and
using an address corresponding to a memory location from said second memory device and transferring a second data set.

21. The method of claim 20, wherein:
said first set of attributes includes a first page size attribute, and said first data set includes a first data set size; and
if said first data set size is at most equal to said first page size attribute, said transferring said first data includes using a first transfer size equal to said first data set size.

22. The method of claim 20, wherein:
said second set of attributes includes a second page size attribute, and said second data set includes a second data set size; and
if said second data set size is greater than said second page size attribute, said transferring said second data set includes:
performing a set of write operations on said second memory device that includes using a second transfer size equal to said second page size attribute until a remaining portion of said second data set that has not yet been written to said second device is less than said second page size attribute, and
using a last transfer size equal to said remaining portion if said remaining portion is less than said page size.

23. The method of claim 20, wherein:
said first set of attributes includes a page size attribute and a block size attribute;
said first data set includes a first data set size;
if said first data set has a first data set size greater than said page size attribute, said transferring of said first data set includes:
performing a set of write operations on said first memory device that includes using a second transfer size equal to said page size attribute until a remaining portion of said first data set that has not yet been written to said first device is less than said page size attribute,
using a last transfer size equal to said remaining portion if said remaining portion is less than said page size.

24. The method of claim 1, wherein said using attributes from said first and second device profile further includes:
performing respective write operations on said first and second memory devices by at least using a transfer size at least equal to a partial page size attribute from said first set of attributes and performing at least one write operation on said second memory device by at least using a transfer size at least equal to a partial page size attribute value from said second set of attributes; and
said attribute difference includes different attribute values of said first and second partial page size attributes.

25. The method of claim 1, wherein said using attributes from said first and second device profile further includes performing a write operation that uses a transfer size equal to a page size attribute value that corresponds to a page size attribute of said first memory device.

26. The method of claim 1, wherein said using attributes from said first and second device profile further includes performing a write operation that uses a transfer size equal to a block size attribute value that corresponds to a block size attribute of said first memory device.

27. The method of claim 26, wherein said using attributes from said first and second device profile further includes performing a write operation that uses a transfer size equal to a multiple of said block size attribute value.

28. The method of claim 2, wherein said using attributes from said first and second device profile further includes performing a write operation that uses a transfer size equal to a multiple of said block size attribute value.

29. A non-transitory computer readable medium comprising computer executable instructions adapted to cause a method of performing memory transactions on a first memory location and a second memory location, said method comprising:
performing a memory transaction comprising addressing a first memory location, said first memory location and a second memory location are respectively associated with a first device profile and a second device profile;
wherein said first device profile is optimal for a data type subject to the memory transaction, wherein said data type comprises one of a random data type or a sequential data type;
said performing the memory transaction further comprising identifying command details for causing the memory transaction to be performed, wherein said command details comprising the first memory device;
said first device profile representing a first set of attributes of said first memory device, and said second device profile representing a second set of attributes of said second memory device, and a difference exists between said first and second device profiles;
after identifying the command details, obtaining the first set of attributes; and
using attributes from said first and second device profiles; and
selecting a transfer size for the memory transaction, wherein the transfer size is a function of a data size of the memory transaction and the first set of attributes.

30. The computer readable medium of claim 29, wherein:
said first memory location is part of a memory space associated with a first memory device;
said second memory location is part of a memory space associated with a second memory device; and
said first and second memory devices comprise at least a portion of a memory store.

31. The computer readable medium of claim 29, wherein at least one attribute of said attributes includes a block size and said difference includes a block size value of a first memory device and a block size value of a second memory device.

32. The computer readable medium of claim 30, wherein at least one attribute of said attributes includes a block size and said difference includes a block size value of said first memory device and a block size value of said second memory device.

33. The computer readable medium of claim 29, wherein said first memory location is located in a first memory device and said second memory location is located in a second memory device.

34. The computer readable medium of claim 29, wherein said difference between said first and second device profiles includes different attributes.

35. The computer readable medium of claim 29, wherein said addressing further includes:
said first and second device profiles having at least one set of shared attributes, and said difference between said first and second device profiles includes different attribute qualifiers for said set of shared attributes; and
said using said attributes from said first and second device profiles includes using said different attribute qualifiers for said shared attributes.

36. The computer readable medium of claim 29, wherein said difference includes different attribute qualifiers for at least one set of shared attributes from said first and second device profiles.

37. The computer readable medium of claim 36, wherein said different attribute qualifiers include different attribute values.

38. The computer readable medium of claim 36, wherein said different attribute qualifiers include different attribute types.

39. The computer readable medium of claim 36, wherein said shared attributes include a memory device type attribute.

40. The computer readable medium of claim 36, wherein said shared attributes include a block size attribute, and said different attribute qualifiers include different block size values.

41. The computer readable medium of claim 36, wherein said shared attributes include a page size attribute and said different attribute qualifiers include different page size values.

42. The computer readable medium of claim 36, wherein said shared attributes includes any one of the following memory device attributes: partial page size, page size, block size, memory protocol, and memory device type.

43. The computer readable medium of claim 36, wherein said shared attributes are memory device type attributes.

44. The computer readable medium of claim 43, wherein said memory device type attributes each correspond to a non-volatile memory device.

45. A memory controller for performing memory transactions, said memory controller comprising:
   means for performing a memory transaction comprising a means for addressing a first memory location, said first memory location and a second memory location are respectively associated with a first device profile and a second device profile;
   said means for addressing is directly coupled to the first memory location and second memory location;
   wherein said means for addressing includes an interface controller means for processing memory transaction requests;
   said means for addressing is directly coupled to a host as said means for addressing addresses the first memory location or second memory location;
   wherein said first device profile is optimal for a data type subject to the memory transaction, wherein said data type comprises one of a random data type or a sequential data type;
   said performing the memory transaction further comprising identifying command details for causing the memory transaction to be performed, wherein said command details comprising the first memory device;
   said first device profile representing a first set of attributes of said first memory location, and said second device profile representing a second set of attributes of said second memory location, and a difference exists between said first and second device profiles;
   said means for addressing obtains the first set of attributes after identifying the command details; and
   said means for addressing uses attributes from said first and second device profiles and selects a transfer size for the memory transaction, wherein the transfer size is a function of a data size of the memory transaction and the first set of attributes.

46. The memory controller of claim 45, wherein said first memory location is located in a first memory device and said second memory location is located in a second memory device.

47. The memory controller of claim 46, wherein said using attributes from said first and second device profile further includes using a first block size attribute from said first set of attributes that differs in attribute value from a second block size attribute from said second set of attributes.

48. The memory controller of claim 46, wherein:
   said first and second device profiles have at least one set of shared attributes, and said difference between said first and second device profiles includes different attribute qualifiers for said set of shared attributes; and
   said use of said attributes from said first and second device profiles by said means for addressing includes using said different attribute qualifiers for said shared attributes.

49. The memory controller of claim 46, wherein said at least one attribute includes a block size and said difference includes a block size value of said first memory device and a block size value of said second memory device.

50. The memory controller of claim 45, wherein said means for addressing further includes a means for addressing said second memory location.

51. The memory controller of claim 45, wherein said difference includes different attribute qualifiers for at least one set of shared attributes from said first and second device profiles.

52. The memory controller of claim 51, wherein said different attribute qualifiers include different attribute values.

53. The memory controller of claim 51, wherein said different attribute qualifiers include different attribute types.

54. The memory controller of claim 51, wherein said shared attributes include a memory device type attribute.

55. The memory controller of claim 51, wherein said shared attributes include a block size attribute, and said different attribute qualifiers include different block size values.

56. The memory controller of claim 51, wherein said shared attributes include a page size attribute and said different attribute qualifiers include different page size values.

57. The memory controller of claim 51, wherein said shared attributes includes any one of the following memory device attributes: partial page size, page size, block size, memory protocol, and memory device type.

58. The memory controller of claim 57, wherein said memory device type attributes each correspond to a non-volatile memory device.

59. A memory controller comprising:
   an interface controller coupled to a memory device interface and an input/output (IO) device interface;
   a memory store;
   wherein the memory device interface is directly coupled to the memory store;
   said interface controller disposed to perform a memory transaction by addressing a first memory location in the memory store, said first memory location and a second memory location respectively associated with a first device profile and a second device profile;
   wherein said first device profile is optimal for a data type subject to the memory transaction, wherein said data type comprises one of a random data type or a sequential data type;
   said interface controller identifies command details for causing the memory transaction to be performed, wherein said command details comprising the first memory device;
   said device profile representing a first set of attributes of said first memory location, and said second device profile representing a second set of attributes of said second memory location, and a difference exists between said first and second device profiles;
   said interface controller obtaining the first set of attributes after identifying the command details; and
   said addressing of said first memory location includes using said attributes from said first device profile; and
   said addressing of said first memory location includes selecting a transfer size for the memory transaction, wherein the transfer size is a function of a data size of the memory transaction and the first set of attributes.

60. The memory controller of claim 59, wherein said interface controller is further disposed to perform another memory transaction by addressing said second memory location by at least using said attributes from said second device profile.

61. The memory controller of claim 59, wherein said interface controller includes:
   a main control device coupled to said memory device interface and to a data path;
   a first memory bus controller coupled to said control device and said memory device interface; and
   an IO bus controller coupled to said IO device interface and said control device.

62. The memory controller of claim 61, wherein said IO bus controller is disposed to respond to a memory transaction request by acknowledging said request and providing status to said main control device.

63. The memory controller of claim 62, wherein said interface controller interprets command details associated with said memory transaction, coordinates the operation of said memory device interface, and manages the transfer of memory transaction data between said IO device interface and said memory device interface through a data path.

64. The memory controller of claim 59, further including a buffer comprising a FIFO and a data path that includes a plurality of queue slots, including a first set of queue slots that buffer data from said IO device interface to said memory device interface, a second set of queue slots that buffer data from said memory device interface to said IO device interface.

65. The memory controller of claim 59, further including a data path that includes a buffer having a plurality of queue slots.

66. The memory controller of claim 65, wherein said buffer is a FIFO and said data path includes a plurality of queue slots that buffer data from said IO device interface to said memory device interface.

67. The memory controller of claim 66, further including another data path that includes a second buffer having a plurality of queue slots that buffer data from said memory device interface to said IO device interface.

68. The memory controller of claim 59, further including a second memory bus controller coupled to a main control device and said memory device interface.

69. The memory controller of claim 59, wherein said difference between said first and second device profiles includes different attributes.

70. The memory controller of claim 59, wherein:
   said first and second device profiles have at least one set of shared attributes, and said difference between said first and second device profiles includes different attribute qualifiers for said set of shared attributes; and
   said using said attributes from said first and second device profiles includes using said different attribute qualifiers for said shared attributes.

71. The memory controller of claim 59, wherein said difference includes different attribute qualifiers for at least one set of shared attributes from said first and second device profiles.

72. The memory controller of claim 71, wherein said shared attributes includes a memory device type attribute.

73. The memory controller of claim 71, wherein said shared attributes includes a block size and said difference includes block size values.

74. The memory controller of claim 71, wherein said shared attributes includes a page size and said difference includes page size values.

75. The memory controller of claim 71, wherein said difference includes different attribute values for said shared attributes, said shared attributes including any one of a partial page size, page size, block size, memory protocol, and memory device type.

76. The memory controller of claim 71, wherein said different attribute qualifiers include different attribute values.

77. The memory controller of claim 71, wherein said different attribute qualifiers include different attribute types.

78. The memory controller of claim 71, wherein said shared attributes include a block size attribute, and said different attribute qualifiers include different block size values.

79. The memory controller of claim 71, wherein said shared attributes include a page size attribute and said different attribute qualifiers include different page size values.

80. An electronic storage device, comprising:
   a memory controller directly coupled to and disposed to address a first memory location and a second memory location which are respectively associated with a first device profile and a second device profile;
   said memory controller directly coupled to a host as said memory controller addresses the first memory location or second memory location;
   wherein said first device profile is optimal for a data type subject to a memory transaction, wherein said data type comprises one of a random data type or a sequential data type;
   said memory controller identifies command details for causing the memory transaction to be performed, wherein said command details comprising the first memory device;
   said first device profile representing a first set of attributes of said first memory location, and said second device profile representing a second set of attributes of said second memory location, and a difference exists between said first and second device profiles;
   said memory controller obtaining the first set of attributes after identifying the command details; and
   said memory controller using attributes from said first and second device profiles; and
   said memory controller selecting a transfer size for the memory transaction, wherein the transfer size is a function of a data size of the memory transaction and the first set of attributes.

81. The electronic storage device of claim 80, wherein said memory controller is further disposed to use a first block size attribute from said first set of attributes that differs in attribute value from a second block size attribute from said second set of attributes.

82. The electronic storage device of claim 80, wherein said first memory location is located in a first memory device and said second memory location is located in a second memory device.

83. The electronic storage device of claim 80, said memory controller further disposed to:
   perform a write operation on said first memory device, if a memory transaction request is associated with a write request;
   perform a read operation on said first memory device, if said memory transaction request is associated with a read request; and
   wherein said using said first and second device profiles includes using said first device profile in response to a first memory transaction request, and using said second device profile in response to receiving a second memory transaction request.

84. The electronic storage device of claim 80, wherein said difference includes different attribute qualifiers for at least one set of shared attributes from said first and second device profiles.

85. The electronic storage device of claim 84, wherein said different attribute qualifiers include different attribute values.

86. The electronic storage device of claim 84, wherein said shared attributes include a memory device type attribute.

87. The electronic storage device of claim 84, wherein said different attribute qualifiers include different attribute types.

88. The electronic storage device of claim 87, wherein said memory controller using different attributes includes using said different attribute qualifiers for said shared attributes.

89. The electronic storage device of claim 87, wherein said memory device type attributes each correspond to a non-volatile memory device.

90. The electronic storage device of claim 84, wherein said shared attributes include a block size attribute, and said different attribute qualifiers include different block size values.

91. The electronic storage device of claim 84, wherein said shared attributes include a page size attribute and said different attribute qualifiers include different page size values.

92. The electronic storage device of claim 84, wherein said shared attributes includes any one of the following memory device attributes: partial page size, page size, block size, memory protocol, and memory device type.

93. The electronic storage device of claim 80, wherein said memory controller is further adapted to:
use a first partial page size attribute by performing a write operation on said first memory device and using a transfer size at least equal to said partial page size attribute; and
use a second partial page size attribute by performing a write operation on said second memory device and using a transfer size at least equal to said second partial page size attribute.

94. The method of claim 1, wherein the first memory location and the second memory location are addressable memory locations.

95. The memory controller of claim 45, wherein the first memory location and the second memory location are addressable memory locations.

96. The memory controller of claim 59, wherein the first memory location and the second memory location are addressable memory locations.

97. The electronic device of claim 80, wherein the first memory location and the second memory location are addressable memory locations.

98. An electronic storage device, comprising: a memory controller directly coupled to and disposed to address a first memory location and a second memory location which are respectively associated with a first device profile and a second device profile;
wherein the memory controller is directly coupled to a host as the memory controller addresses the first memory location or the second memory location;
wherein said first device profile is optimal for a data type subject to a memory transaction, wherein said data type comprises one of a random data type or a sequential data type;
said memory controller identifies command details for causing the memory transaction to be performed, wherein said command details comprising the first memory device;
the first device profile representing a first set of attributes of the first memory location, and the second device profile representing a second set of attributes of the second memory location;
said memory controller obtaining the first set of attributes after identifying the command details; and
wherein said memory controller uses attributes from the first and second device profiles;
wherein said memory controller selecting a transfer size for the memory transaction, wherein the transfer size is a function of a data size of the memory transaction and the first set of attributes.

99. The electronic devices of claim 98, wherein the memory controller comprises:
an interface controller;
a memory device interface directly coupled to the first memory location and to the second memory location and coupled to the interface controller;
an input/output (IO) device interface coupled to the interface controller and directly coupled to the host as the memory controller addresses the first memory location or the second memory location.

100. A method for performing memory transactions, the method comprising:
performing a memory transaction comprising addressing a first memory location in a first memory device in a memory store, the first memory location and a second memory location respectively associated with a first device profile and a second device profile;
wherein said first device profile is optimal for a data type subject to the memory transaction, wherein said data type comprises one of a random data type or a sequential data type;
said performing the memory transaction further comprising identifying command details for causing the memory transaction to be performed, wherein said command details comprising the first memory device;
the first device profile representing a first set of attributes of the first memory location, and the second device profile representing a second set of attributes of the second memory location;
after identifying the command details, obtaining the first set of attributes;
wherein the memory store is directly coupled to a memory controller, and wherein the memory controller performs a memory transaction;
wherein a host is directly coupled to the memory controller as the memory controller performs the memory transaction; and
using attributes from the first and second device profiles; and
selecting a transfer size for the memory transaction, wherein the transfer size is a function of a data size of the memory transaction and the first set of attributes.

101. The method of claim 100, wherein the memory controller comprises:
an interface controller;
a memory device interface directly coupled to the first memory location and to the second memory location and coupled to the interface controller;
an input/output (IO) device interface coupled to the interface controller and directly coupled to the host as the memory controller addresses the first memory location or the second memory location.

* * * * *